(12) United States Patent
Beuchert et al.

(10) Patent No.: US 11,795,008 B2
(45) Date of Patent: Oct. 24, 2023

(54) SYSTEMS, DEVICES, AND METHODS FOR EXTENDABLE CONVEYORS

(71) Applicant: CALJAN A/S, Hasselager (DK)

(72) Inventors: Karsten Beuchert, Hedensted (DK); Anders Pedersen, Sabro (DK)

(73) Assignee: CALJAN A/S, Hasselager (DK)

( * ) Notice: Subject to any disclaimer, the term of this patent is extended or adjusted under 35 U.S.C. 154(b) by 106 days.

(21) Appl. No.: 17/477,630

(22) Filed: Sep. 17, 2021

(65) Prior Publication Data
US 2022/0081221 A1 Mar. 17, 2022

(30) Foreign Application Priority Data
Sep. 17, 2020 (EP) .................................... 20196646

(51) Int. Cl.
| | |
|---|---|
| B65G 47/31 | (2006.01) |
| B65G 15/24 | (2006.01) |
| B65G 41/00 | (2006.01) |
| B65G 43/08 | (2006.01) |
| B65G 43/10 | (2006.01) |

(52) U.S. Cl.
CPC ............ B65G 47/31 (2013.01); B65G 15/24 (2013.01); B65G 41/003 (2013.01); B65G 43/08 (2013.01); B65G 43/10 (2013.01); B65G 2203/0233 (2013.01); B65G 2203/0291 (2013.01); B65G 2203/042 (2013.01)

(58) Field of Classification Search
CPC ...... B65G 47/31; B65G 15/24; B65G 41/003; B65G 43/08; B65G 43/10; B65G 2203/0233; B65G 2203/0291; B65G 2203/042

See application file for complete search history.

(56) References Cited

U.S. PATENT DOCUMENTS

| | | | |
|---|---|---|---|
| 2,847,110 A | 8/1958 | Rysti | |
| 4,232,778 A | 11/1980 | Rysti | |
| 5,640,833 A | 6/1997 | Gerber | |

(Continued)

FOREIGN PATENT DOCUMENTS

| | | |
|---|---|---|
| EP | 2072423 A1 | 6/2009 |
| EP | 3 296 235 A1 | 3/2018 |
| JP | S52140583 U | 10/1977 |

OTHER PUBLICATIONS

Extended European Search Report dated Mar. 2, 2021 for Application No. 20196646.2.

(Continued)

*Primary Examiner* — Gene O Crawford
*Assistant Examiner* — Lester Rushin, III
(74) *Attorney, Agent, or Firm* — Schmeiser, Olsen & Watts, LLP (57) ABSTRACT

Systems, devices, methods and computer program products for extendable conveyors are provided. A system includes an extendable conveyor and a separation module. The extendable conveyor is operable to convey items from an upstream side of the extendable conveyor to a downstream side of the extendable conveyor. Further, it is configured to increase the distance from the upstream side to the downstream side. The separation module is operable for conveying items towards the extendable conveyor and configured to decelerate the conveying of the items on the separation module.

12 Claims, 8 Drawing Sheets

(56) References Cited

U.S. PATENT DOCUMENTS

| | | | | |
|---|---|---|---|---|
| 2002/0072317 A1* | 6/2002 | Livingston | ............ | A01K 45/005 |
| | | | | 452/53 |
| 2010/0276249 A1* | 11/2010 | Kalm | ........................ | B65H 1/22 |
| | | | | 198/418.9 |
| 2012/0087770 A1 | 4/2012 | Pippin | | |
| 2017/0362036 A1* | 12/2017 | Hartmann | ............ | G05B 19/418 |
| 2018/0362036 A1* | 12/2018 | Liles | ..................... | B60W 50/14 |
| 2022/0063935 A1* | 3/2022 | Sleeman | ................ | B65G 67/04 |

OTHER PUBLICATIONS

European Search Report dated Feb. 22, 2021 for Application No. 20196646.2.

* cited by examiner

Fig. 8

SYSTEMS, DEVICES, AND METHODS FOR EXTENDABLE CONVEYORS

CROSS-REFERENCE TO RELATED APPLICATIONS

This application claims priority to European Patent Application No. 20196646.2, having a filing date of Sep. 17, 2020, the entire contents of which are hereby incorporated by reference.

FIELD OF TECHNOLOGY

The following pertains to conveyors and, more specifically, to extendable conveyors.

BACKGROUND

Conveyors include a plurality of belts and/or rollers (e.g., cylindrical or spherical rollers) for moving boxes, luggage, parcels and other items over the length of an upper conveying surface of the conveyor. The upper conveying surface can be horizontal, or it can be at a fixed or adjustable incline (positive or negative slope). Certain conveyors have a series of telescopically connected portions that make the upper conveying surface extendable in length.

Such extendable or telescopic conveyors are used in conveyor lines, e.g., for processing incoming or outgoing items in a warehouse. Telescopic conveyors allow to increase or decrease the length of the conveyor, depending on current needs. For instance, the distance over which items are to be conveyed may be increased (or decreased) by extending (or retracting) portions of the telescopic conveyor.

A common extendable or telescopic conveyor may comprise a fixed base portion and one or more movable telescope portions. The telescope portion(s) may be brought into close proximity, e.g., beneath or within, the base portion to form a retracted state of the telescopic conveyor. In an extended state, the telescope portions may be distributed along a conveying path of the telescopic conveyor.

An exemplary use scenario for telescopic conveyors at a loading dock may be for bridging the gap between a conveyor line of a warehouse and a delivery vehicle parked at a loading dock of the warehouse. The telescopic conveyor may be in a retracted state until the delivery vehicle is parked and ready for, e.g., loading. The telescopic conveyor may then be extended towards the delivery vehicle. During the loading process, a large number of items may be conveyed along the telescopic conveyor. In some instances, these items may arrive in a bulk, e.g., piled on top of each other. In such situations, there is a risk of some or all of the items out of the bulk to fall off the telescopic conveyor, in particular along the lateral sides of the movable telescope portions thereof. The fixed base portion may typically be equipped with side rails or side guards, to prevent items from falling. However, the telescope portions may or may not be equipped with side guards or side rails. Presence of side guards or side rails is known to enlarge the overall build size of the telescopic conveyor, add complexity and give rise to safety risks.

Thus, there is a need for a compact telescopic conveyor system with a reduced risk of item loss.

SUMMARY

According to a first aspect, a conveying system is provided. The system comprises an extendable conveyor and a separation module.

The extendable conveyor is operable to convey items from an upstream side of the extendable conveyor to a downstream side of the extendable conveyor. Further, it is configured to increase the distance from the upstream side to the downstream side.

The separation module is operable for conveying items towards the extendable conveyor and configured to decelerate the conveying of the items on the separation module.

The deceleration of the items on the separation module allows to impart an additional impulse on the items. As a result, in combination with the extendable conveyor, a bulk of items (e.g., a pile of items) is separated into single pieces or at least a considerably smaller bulk load, as will be described in greater detail below.

As a result of the separation of the bulk of items, the risk of items falling off the side of the extendable conveyor, in particular along any movable telescope portions thereof, is reduced.

In some embodiments, the separation module may be configured to convey the items at variable speeds. By increasing the conveying speed of the separation module, an acceleration of the items may be achieved. Conversely, by decreasing the conveying speed, a deceleration of the items (imparting an impulse on the items) may be achieved. In particular, the latter may be used to separate a bulk of items.

In some examples, the separation module may be configured to decelerate the conveying of the items fully to a halt, i.e., to a conveying speed of zero velocity.

In some embodiments, the separation module may be configured to convey items at least at a first speed and at a second speed, the first speed being smaller than the second speed. The extendable conveyor may be configured to convey items at least at essentially the second speed. In other words, the separation module may be operable at various speeds, wherein the various speeds comprise at least a conveying speed of the extendable conveyor and a smaller speed. For instance, the conveying speed of such separation module may be varied from the first speed to the second speed. Conversely, the conveying speed of the separation module may be varied (or adjusted) from the second speed to the first speed, thereby decelerating any items on the separation module. Upon (re-)acceleration of the separation module to the second speed, the separation module and the extendable conveyor operate at a same speed, thereby effectively conveying the items in a uniform fashion. Upon deceleration of the separation module, the extendable conveyor may be operated at a faster pace, thereby allowing to convey the same number of items per unit time as the separation module, but at a smaller density (i.e., larger gaps between items) than the separation module.

In some embodiments, the separation module may be configured to be positioned relative to the extendable conveyor with a level difference between a conveying surface of the separation module and a conveying surface of the extendable conveyor at its upstream side. In particular, the level difference may be such that the conveying surface of the separation module is vertically above the conveying surface of the extendable conveyor. In this respect, the term "vertically above" relates to the direction of gravity force in the common operating arrangement of the system. Such level difference allows to impart a force on any items which reach the end of the separating module in conveying direction. Upon reaching the end of the separating module, the items are pushed over the level difference, e.g., in combination with a deceleration in conveying direction as detailed above. This allows to impart a force on the items so as to make the top-most items out of a bulk of items tumble towards the front (in conveying direction), thereby further separating the bulk of items.

In some examples, the level difference may be adjustable or may be predefined. As adjustable level difference may be adjusted, for instance in dependence of one or more of the following: an average size of items to be conveyed, a minimum size of items to be conveyed, a maximum size of items to be conveyed, a throughout flow of items to be conveyed (number of items per unit time), a conveying speed of the extendable conveyor, or any combination thereof.

In some embodiments, the system may further comprise one or more sensors. The sensors may be configured to detect the presence (or absence) of items at one or more of the following: the separation module, the upstream side of the extendable conveyor, at the downstream side of the on the extendable conveyor, or any combination thereof. Examples of sensors include photodiodes, laser or light barriers, etc.

For instance, sensors monitoring the separation module may be used to detect whether there are any items on the separation module. In the absence of items, the separation module may be operated without deceleration. The separation module may, for instance, be operated at the same speed as the extendable conveyor, in order to ensure further in-flow of further items. In the presence of items on the separation module, it may further be detected whether it is a single item or a bulk of items. At least in the latter case, the separation module may for instance be operated to execute a deceleration, in order to separate the bulk.

Additionally, or alternatively, sensors monitoring the upstream side of the extendable conveyor may be used to detect whether there are any items at the upstream side of the extendable conveyor. In the presence of items at the upstream side of the extendable conveyor, the separation module may be operated to stay or be in a halted or slow state, in order to allow the items at the upstream side of the extendable conveyor to be conveyed onwards. In the absence of items at the upstream side of the extendable conveyor, the separation module may be operated at the same speed as the extendable conveyor, in order to ensure further in-flow of further items.

Additionally, or alternatively, sensors monitoring the downstream side of the extendable conveyor may be used to detect whether there are any items at the downstream side of the extendable conveyor. In the presence of items at the downstream side of the extendable conveyor, the extendable conveyor (and potentially the separation module) may be operated to be in a halted (or slow) state, in order to allow the items at the downstream side of the extendable conveyor to be transported away (e.g., loaded into a truck). In the absence of items at the downstream side of the extendable conveyor, the extendable conveyor may be operated at regular speed, in order to ensure further in-flow of further items (e.g., to be loaded into the truck).

The separation module may be operated correspondingly.

In some embodiments, the system may further comprise a flexible strip curtain. The curtain may have at least three members, wherein one (or more) second member(s) is (are) positioned between the first and third members and has (have) a higher flexibility than the first and third members. For instance, the curtain may be arranged essentially in a plane, which is transverse to the conveying direction of the conveying system. The at least three members may be flexible strips, which are held by a frame or beam.

The flexible strip curtain may be positioned in proximity to the extendable conveyor. For instance, a frame or beam, holding the members of the curtain, may extend (essentially horizontally) across a conveying surface of the extendable conveyor, e.g., perpendicular to the conveying direction. The at least three members may each extend (essentially vertically) from the frame or beam towards the conveying surface underneath, such that items being conveyed on the conveying surface pass through the flexible strip curtain.

The first and third members may be positioned closer to the sides of the conveying surface than the second member (s), such that any items which are conveyed at or close to the sides of the conveying surface come into contact with first member or with the third member.

In some examples, the cross-sections of the first and third members may be shaped asymmetrically, such as to impart a force on items travelling along the conveying direction through the curtain, the force acting at least partially perpendicular to the conveying direction towards the central longitudinal axis of the extendable conveyor. For instance, a wedge-like cross-section may be used to impart a force due to its asymmetric shape, as will be described in more detail with reference to embodiments further below.

The flexible strip curtain of the present disclosure may be used as a part of the system according to the first aspect. It should be noted however that some or all of the advantages of the flexible strip curtain may also be realized in the absence of a separation module and/or of an extendable conveyor. Thus, the teachings disclosed herein also provide for a flexible strip curtain, for use with a conveying system. Thus, according to a second aspect, a flexible strip curtain, as described above, is provided.

According to a third aspect, a separation module for use in a conveying system according to the first aspect is provided. The separation module allows to provide for the advantages described herein, in form of an add-on module to existing extendable conveyors.

According to a fourth aspect, a method for controlling a conveying system with an extendable conveyor and a separation module is provided. The method comprises a step of detecting a presence of a plurality of items at the separation module, and a step of controlling, responsive to the detecting, a conveying speed of the separation module to decelerate the plurality of items.

In some embodiments, the detecting may further comprise detecting the presence or absence of items at the upstream side of the extendable conveyor and/or detecting the presence or absence of items at the downstream side of the extendable conveyor. For instance, such detecting may be performed using one or more sensors as described above.

In some embodiments, the method may further comprise controlling a conveying speed of the extendable conveyor based on the outcome of the detecting, in particular the detecting of presence or absence of items at one or more of the following: the separation module; the upstream side of the extendable conveyor; the downstream side of the extendable conveyor.

For instance, in response to a detecting of items at the separation module, the separation module may be controlled to perform a deceleration. In response to a detecting of the absence of items at the separation module, the separation module may be controlled to run at a predetermined speed, e.g., at the current conveying speed of the extendable conveyor.

Additionally, or alternatively, in response to a detecting of items at the upstream side of the extendable conveyor, the separation module may be controlled to halt (or convey at reduced speed). In response to a detecting of the absence of items at the upstream side of the extendable conveyor, the separation module may be controlled to run at the current conveying speed of the extendable conveyor.

Additionally, or alternatively, in response to a detecting of items at the downstream side of the extendable conveyor, the extendable conveyor may be controlled to halt (or convey at reduced speed). In response to a detecting of the absence of items at the downstream side of the extendable conveyor, the extendable conveyor may be controlled to run at its regular speed.

According to a fifth aspect, a computer program product (non-transitory computer readable storage medium having instructions, which when executed by a processor, perform actions) is provided, which includes program code configured to, when executed in a computing device, to carry out the steps of a method of the fourth aspect.

BRIEF DESCRIPTION

Some of the embodiments will be described in detail, with references to the following Figures, wherein like designations denote like members, wherein.

DETAILED DESCRIPTION

As discussed above, in known systems, a plurality of items may be conveyed on a telescopic conveyor. The teaching disclosed herein provides for improved conveyer systems, devices, methods and computer program products, inter alia in terms of reliability, build size, complexity, safety or throughput.

Figure 1:
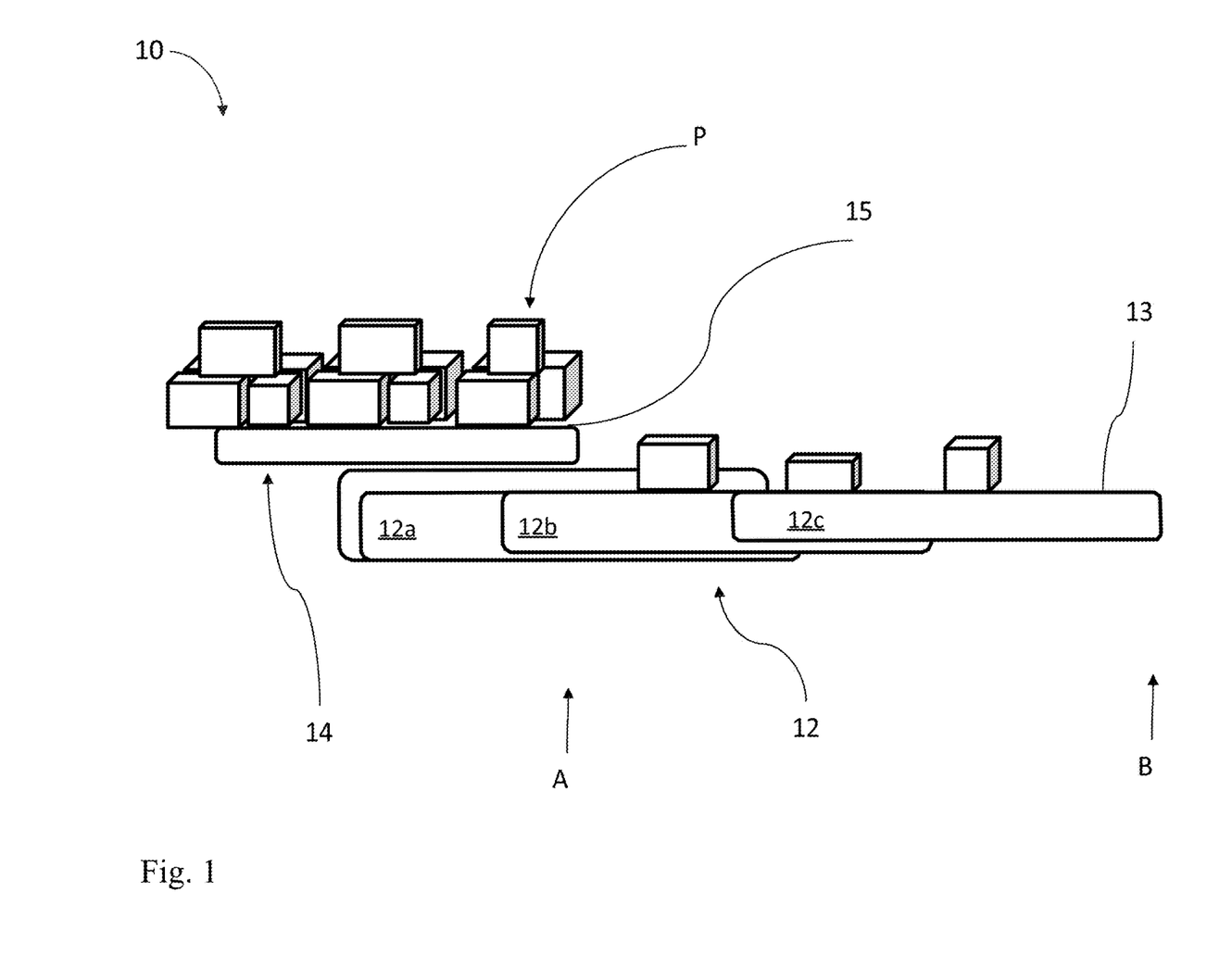
FIG. 1 is a schematic side view of a system according to the teachings disclosed herein.

FIG. 1 is a schematic side view of a conveying system 10. The system 10 comprises an extendable conveyor 12 and a separation module 14.

The extendable conveyor 12 is operable to convey items P from an upstream side A of the extendable conveyor 12 to a downstream side B of the extendable conveyor 12. Further, the extendable conveyor 12 is configured to increase the distance from the upstream side A to the downstream side B. For this purpose, it has a fixed base portion 12a and multiple movable telescope portions 12b, 12c. The telescope portions 12b, 12c may be retracted beneath or within the base portion 12a to form a retracted state (not shown) of the extendable conveyor. In FIG. 1, an extended state is shown, wherein the telescope portions are distributed along a conveying path of the telescopic conveyor 12. Thus, the extendable conveyor 12 allows to increase or decrease the length of the conveyor.

The separation module 14 is operable for conveying the items P towards the upstream side A of the extendable conveyor 12 at variable speeds. In particular, it is configured to decelerate the conveying of the items P on the separation module, as will be described with reference to FIG. 2 in detail further below. The deceleration of the separation module 14 imparts an impulse on the items P, thereby allowing to separate the pile of items P into single pieces.

The separation module 14 is positioned relative to the extendable conveyor 12 with a vertical level difference between a conveying surface 15 of the separation module 14 and a conveying surface 13 of the extendable conveyor 12 at its upstream side A. The conveying surface 15 of the separation module 14 is vertically above the conveying surface 13 of the extendable conveyor 12. In the example shown, the level difference is a vertical step. In other examples, the level difference may be realized with an inclined plane, e.g., in form of a plate. It should be noted that the teachings disclosed herein may also be realized without any or with essentially no level difference between the conveying surface of the separation module 14 and the conveying surface of the extendable conveyor 12.

When items P reach the end of the separating module 14, they are being conveyed over the downward step formed by the level difference. As a result, the upper items out of the bulk of items P tumble towards the front (in conveying direction), thereby further separating the bulk of items.

As can be seen from FIG. 1, the separation module 14 may at least partly overlap with the extendable conveyor 12. In this case, the upstream side A may be defined as the region of interface, where items from the separation module 14 are conveyed onto the extendable conveyor 12, even if the extendable conveyor 12 extends further upstream (underneath the separation module 14). In other embodiments, the separation module 14 may fully overlap with the extendable conveyor 12. In still other embodiments (not shown), the separation module 14 may show essentially no overlap with the extendable conveyor 12, in which case the upstream side A of the extendable conveyor 12 corresponds to a front-end face of the extendable conveyor 12.

Figure 2A:
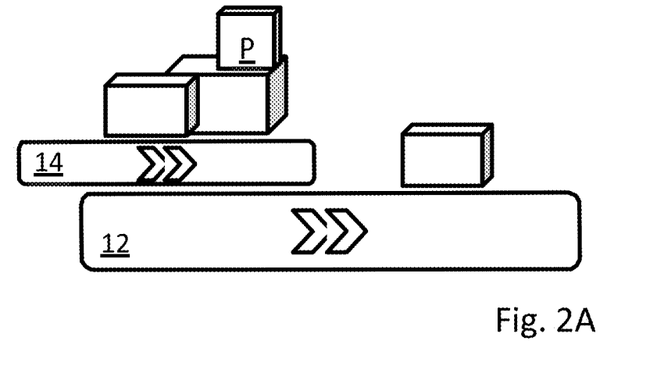
FIG. 2A illustrates a state of the operation of the system according to FIG. 1.
Figure 2B:
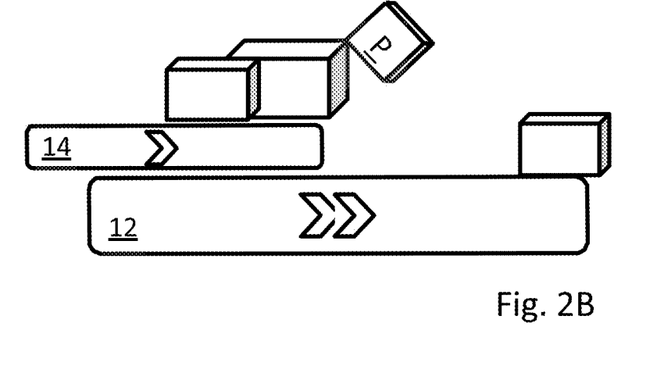
FIG. 2B illustrates another state of the operation of the system according to FIG. 1.
Figure 2C:
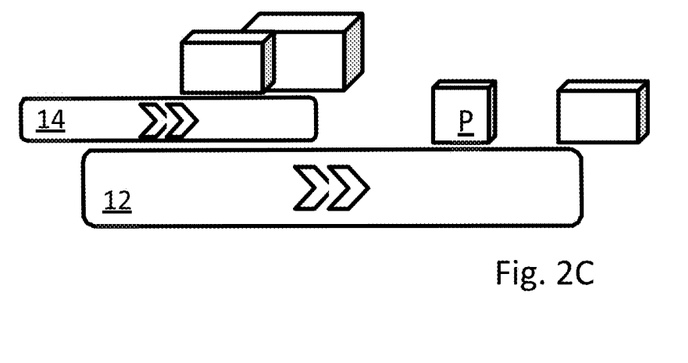
FIG. 2C illustrates another state of the operation of the system according to FIG. 1.

FIG. 2A-2C illustrates the operation of the conveying system of FIG. 1. FIGS. 2A-2C illustrate a sequence of three sequential states. FIG. 2A shows a first state, wherein a bulk of items P are loaded into the conveying system. For instance, the bulk of items may stem from a chute leading onto the separating conveyor.

If the bulk of items P were to be conveyed uniformly starting from the state of FIG. 2A, then a pile of items would be conveyed by the extendable conveyor 12. The pile may or may not be conveyable over the length of the fixed base portion (which is often equipped with side guards, not shown so as not to obstruct the illustration). However, at least at the telescope portions, the pile of items is prone to falling over the edge of the sides of the extendable conveyor.

Thus, in order to separate the bulk of items P into a line of single items, the conveying system 10 is equipped with a separation module 14. The separation module comprises a conveyor operable to run at at least two speeds, a first speed and a second speed. In this example, the second speed is larger than the first speed. In FIG. 2A, the separation module 14 runs at the second speed, illustrated in FIG. 2A by a double arrow.

When items P have been conveyed over the length of the separation module and reach the interface with the extendable conveyor 14, the speed of the separation module is decreased to the first speed, illustrated in FIG. 2B by a single arrow. In the example shown, the separation module 14 runs at a finite first speed. In other examples, the state corresponding to FIG. 2B may alternatively be attained by using a velocity of zero, i.e., by halting the separation module 14.

In any case, by decreasing the conveying speed, a deceleration of the items P is achieved, and an impulse is imparted on the items, such that the pile of items P is separated into single pieces. In FIG. 2B, the item P which is the top- and front-most item of the pile, falls onto the extendable conveyor 12.

This effect is further strengthened by the additional impulse acting on the upper items in the pile as a result of the level difference between the separation module 14 and the extendable conveyor 12. Since one or very few of the items P tumble onto the extendable conveyor 12 as a result of the deceleration of the separation module 14 and/or the level difference, the extendable conveyor 12 acts to convey these items away at a greater speed than the current speed of the separation module 14. The extendable conveyor thereby creates gaps in conveying direction between the items which have already tumbled onto the extendable conveyor 12 and the items which remain on the separation module 14.

Turning to FIG. 2C: Once the items on the extendable conveyor 12 have been conveyed onwards, the next items on the separation module 14 are conveyed to the interface between the separation module 14 and the extendable conveyor 12. At this stage, the process described above recommences anew.

Thus, the system 10 described with reference to FIGS. 1 and 2 allows create gaps in conveying direction between the various items, even if these items are loaded into the system in a bulk. In embodiments, the system 10 may further be equipped with means to further minimize the risk of the separated items from falling over the sides of the extendable conveyor. An exemplary flexible strip curtain will be described with reference to FIGS. 3 and 4 in the following.

Figure 3:
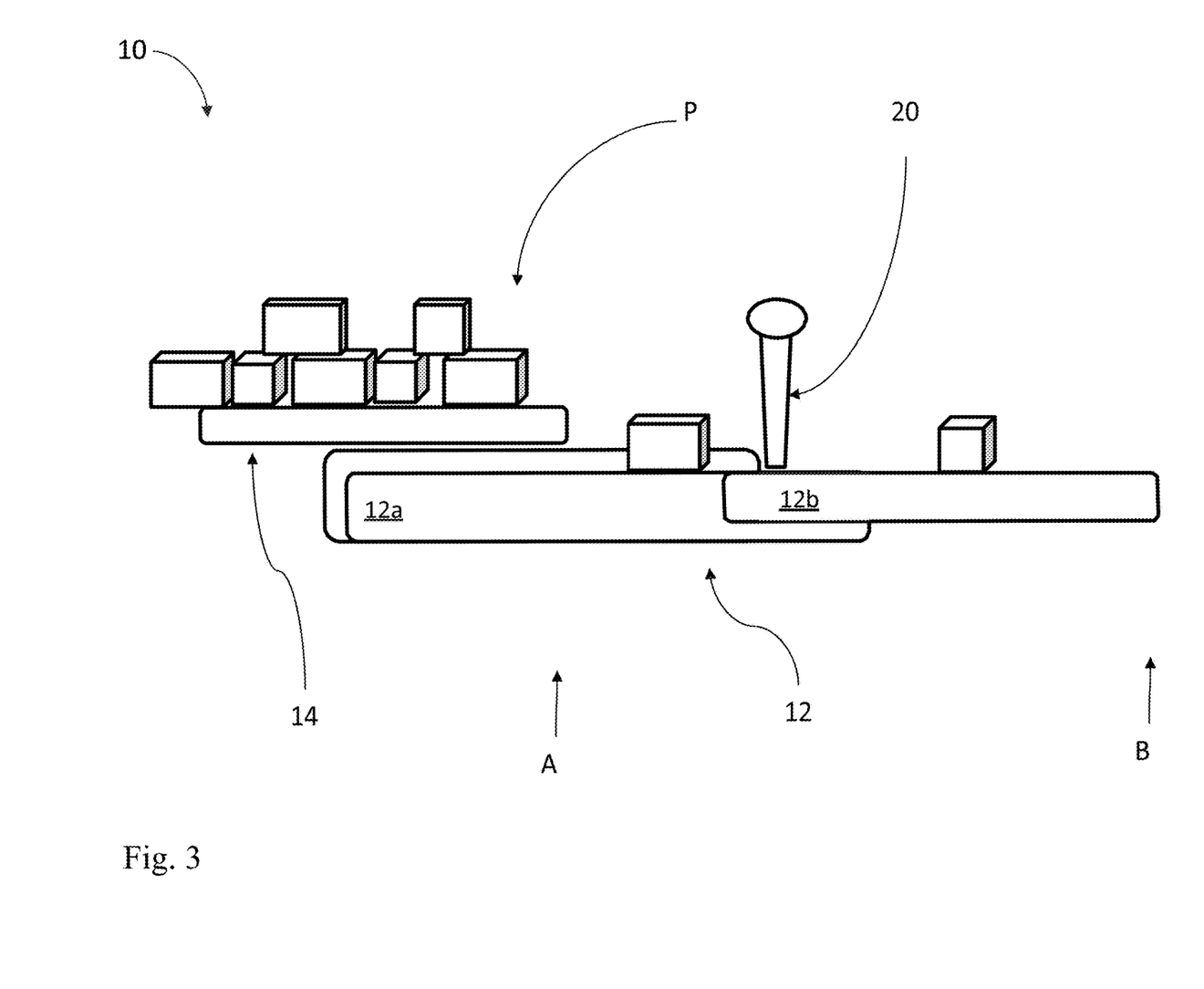
FIG. 3 is a schematic side view of a system according to the teachings disclosed herein.

FIG. 3 is a schematic side view of a system 10, which comprises an extendable conveyor 12 and a separation module 14. These elements and their operation are essentially similar to the corresponding elements of FIGS. 1 and 2 above. The respective description thus applies correspondingly here and is referred to for reasons of conciseness.

In addition, system 10 of FIG. 3 comprises a flexible strip curtain 20. The curtain 20 may have multiple members in form of flexible strips.

The curtain 20 is arranged essentially in a plane, which is transverse to the conveying direction of the conveying system and perpendicular to the paper plane of FIG. 3. The flexible strip curtain 20 is positioned over the conveying surface of the extendable conveyor 12. In particular, a frame holds the curtain 20 and extends across the conveying surface of the extendable conveyor 12.

Figure 4:
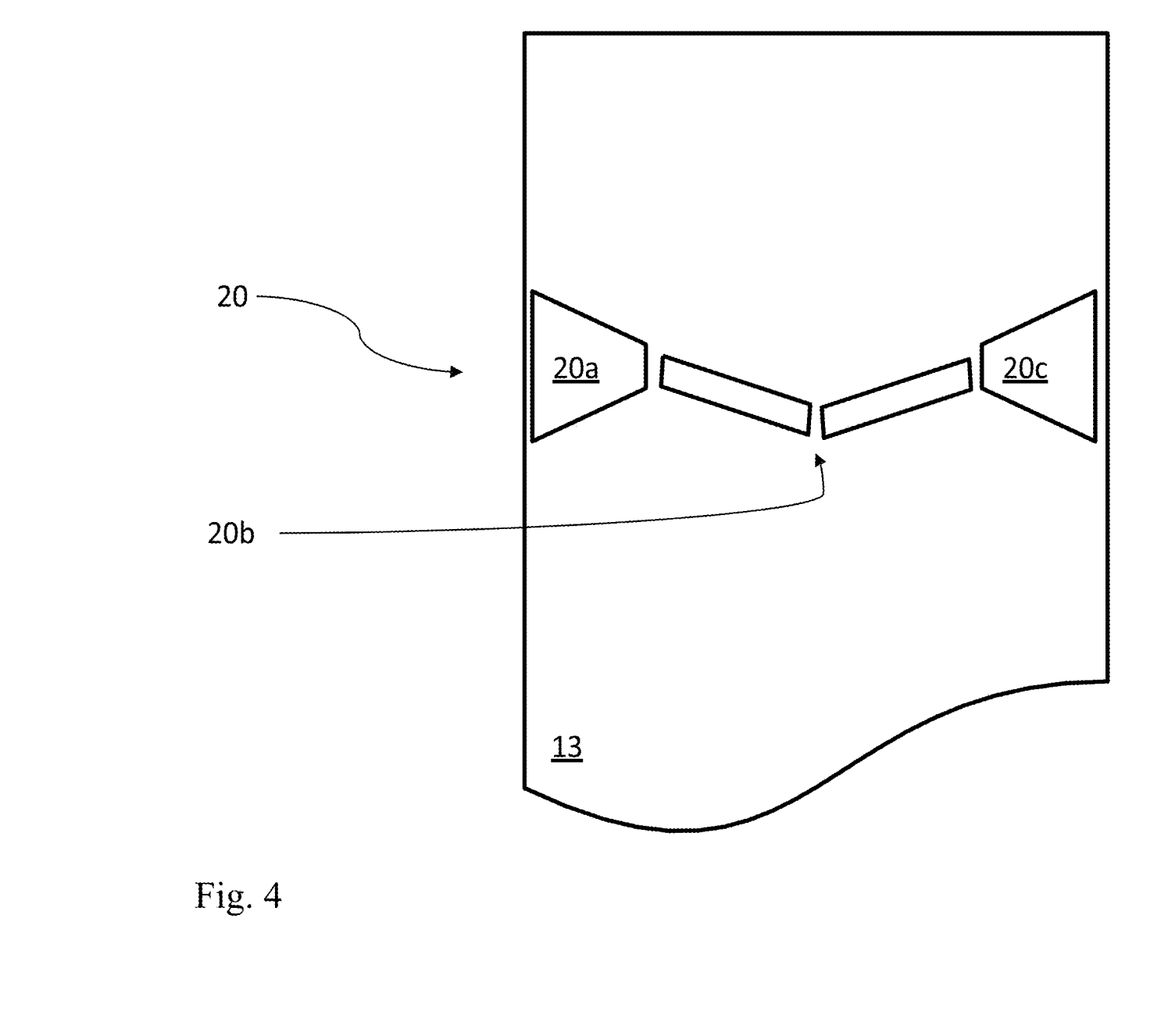
FIG. 4 is a schematic top view of a strip curtain according to the teachings disclosed herein.

FIG. 4 is a schematic top view of the strip curtain 20 of FIG. 3 and of the upper conveying surface 13 of a conveyor. The curtain 20 comprises multiple members 20a, 20b, 20c, . . . . The multiple members each extend essentially vertically from a frame towards the conveying surface 13 (e.g., of the extendable conveyor 12) underneath, such that items being conveyed on the conveying surface 13 pass through the flexible strip curtain 20.

In the example of FIG. 4, two second members 20b are positioned between the first member 20a and the third member 20c. The second members 20b have a higher flexibility than the first member 20a and the third member 20c.

The first member 20a and the third member 20c are positioned closer to the side of the conveying surface 13 than the second members 20b. As a result, items being conveyed at or close to the sides of the conveying surface 13 come into contact with first member 20a or with the third member 20c.

The cross-sections of the first member 20a and the third member 20c are shaped asymmetrically.

In the example shown, they are shaped to have a wedge-like cross-section with a broader portion of the wedge-shape positioned towards the side of the conveying surface 13 and a narrower portion of the wedge-shape positioned towards the central longitudinal axis of the conveying surface 13.

The relatively low flexibility of the first and third members 20a, 20c allows them to act as "fenders" and to impart a force on those items, which pass through the curtain along the sides of the conveying surface and which are thus prone to the risk of falling over the side edges, in particular in the absence of side guards. The force acts essentially perpendicular to the conveying direction towards the central longitudinal axis of the extendable conveyor 12. For this purpose, the example shown presents a wedge-like cross-section. A wide variety of asymmetric-shaped cross-sections (e.g., triangular, trapezoidal, semi-circular, semi-elliptical, etc.) may be used such as to impart such force towards the central longitudinal axis, as will be apparent to the skilled person.

The flexible strip curtain of FIG. 4 may also be used in the absence of a system according to FIG. 1 or 3, in order to essentially align items along a longitudinal axis of a conveyor.

Figure 5:
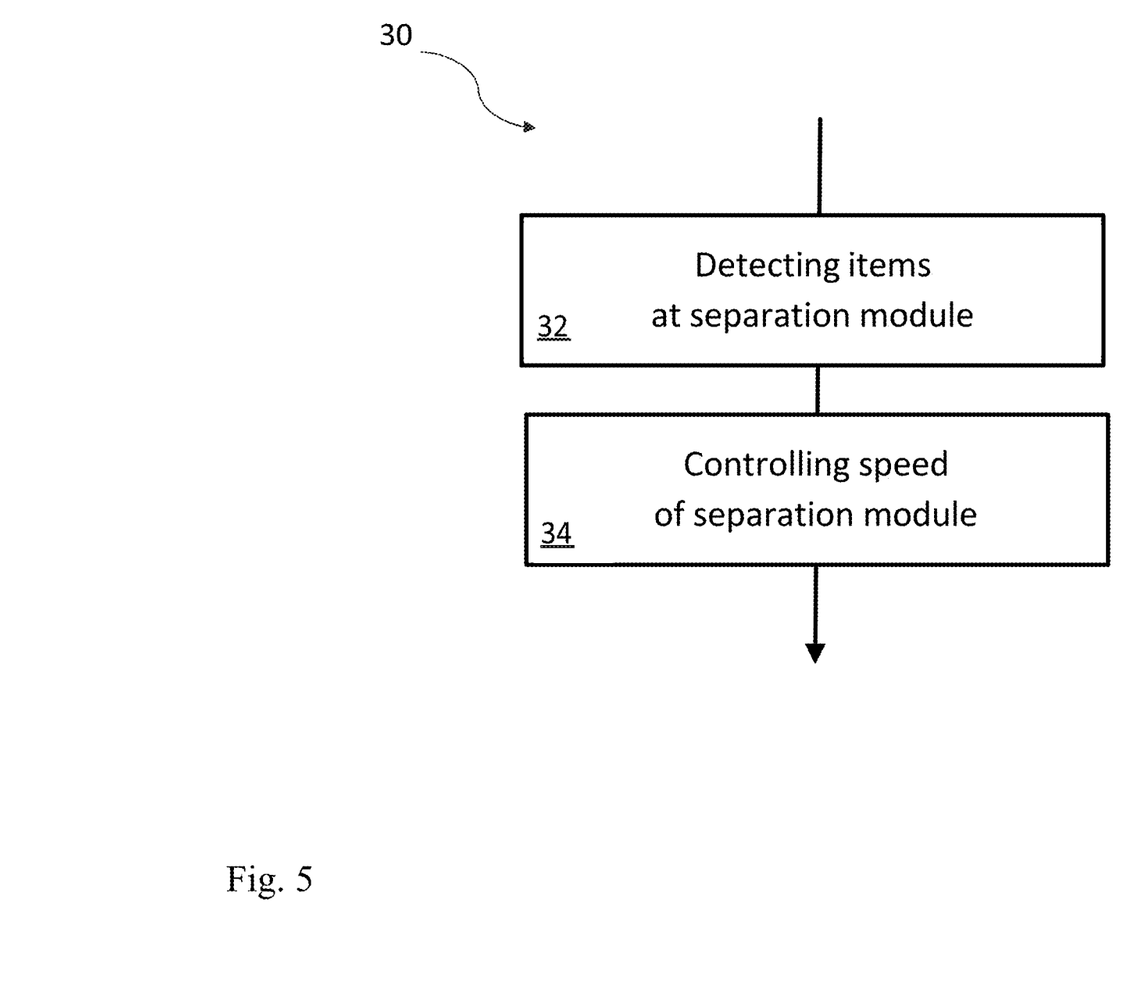
FIG. 5 is a high-level flowchart of a method according to the teachings disclosed herein.

FIG. 5 is a high-level flowchart of a method 30 for controlling a conveying system with an extendable conveyor and a separation module. The method 30 comprises a step 32 of detecting a presence of a plurality of items at the separation module, and a step 34 of controlling, responsive to the detecting, a conveying speed of the separation module to decelerate the plurality of items.

For instance, the detecting may be performed using one or more sensors at the separation module.

Figure 6:
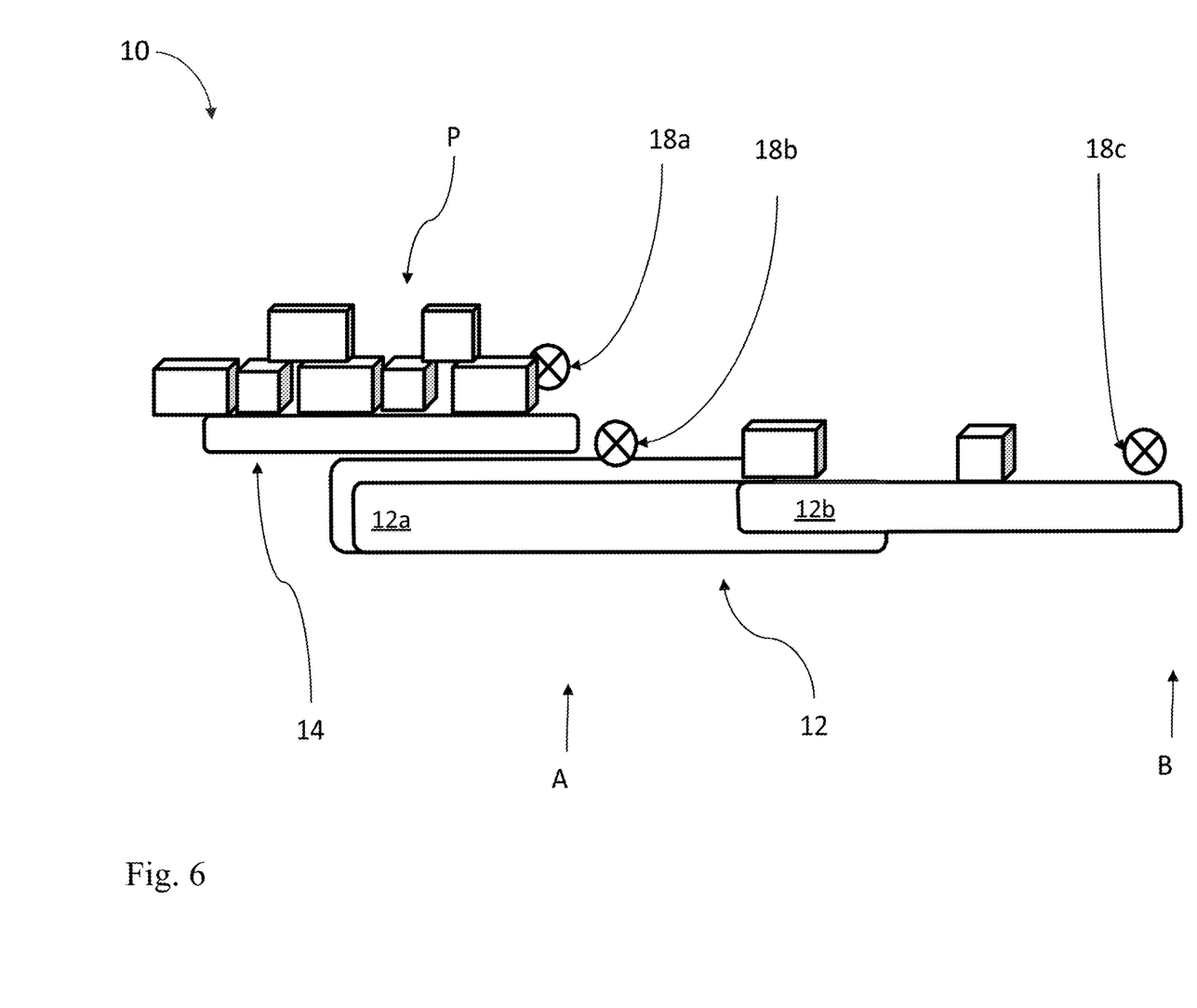
FIG. 6 is a schematic side view of a system according to the teachings disclosed herein.

FIG. 6 is a schematic side view of a system 10, which comprises an extendable conveyor 12 and a separation module 14. These elements and their operation are essentially similar to the corresponding elements of FIGS. 1 to 3 above. The respective description thus applies correspondingly here and is referred to for increased conciseness.

In addition, system 10 of FIG. 6 comprises multiple sensors 18. The various sensors 18a, 18b, 18c are photodiodes, which are configured to detect the presence (or absence) of items at various locations: First sensor 18a monitors the separation module 14. Second sensor 18b monitors the upstream side A of the extendable conveyor 12. Third sensor 18c monitors the downstream side B of the extendable conveyor 12.

First sensor 18a may be used to detect whether there are any items (or a bulk of items) on the separation module 14, e.g., at the interface with the upstream side A of the extendable conveyor 12. In the absence of items, the separation module 14 may be operated without deceleration. The separation module 14 may, for instance, be operated at the same speed as the extendable conveyor 12, in order to ensure further in-flow of further items. In the presence of items on the separation module 14, it may further be detected whether it is a single item or a bulk of items. At least in the latter case, the separation module 14 may for instance be operated to execute a deceleration, in order to separate the bulk.

Second sensor 18b may be used to detect whether there are any items at the upstream side A of the extendable conveyor 12. In the presence of items at the upstream side A of the extendable conveyor 12, the separation module 14 may be operated to stay or be in a halted or slow state, in order to allow the items at the upstream side A of the extendable conveyor 12 to be conveyed onwards. In the absence of items at the upstream side A of the extendable conveyor 12, the separation module 14 may be operated at the same speed as the extendable conveyor 12, in order to ensure further in-flow of further items.

Third sensor 18c may be used to detect whether there are any items at the downstream side B of the extendable conveyor 12. In the presence of items at the downstream side B of the extendable conveyor 12, the extendable conveyor 12 (and potentially the separation module 14) may be operated to be in a halted (or slow) state, in order to allow the items at the downstream side B of the extendable conveyor 12 to be handled. In the absence of items at the downstream side B of the extendable conveyor 12, the extendable conveyor 12 may be operated at regular speed, in order to ensure further in-flow of further items. The separation module 14 may be operated correspondingly.

Figure 7:
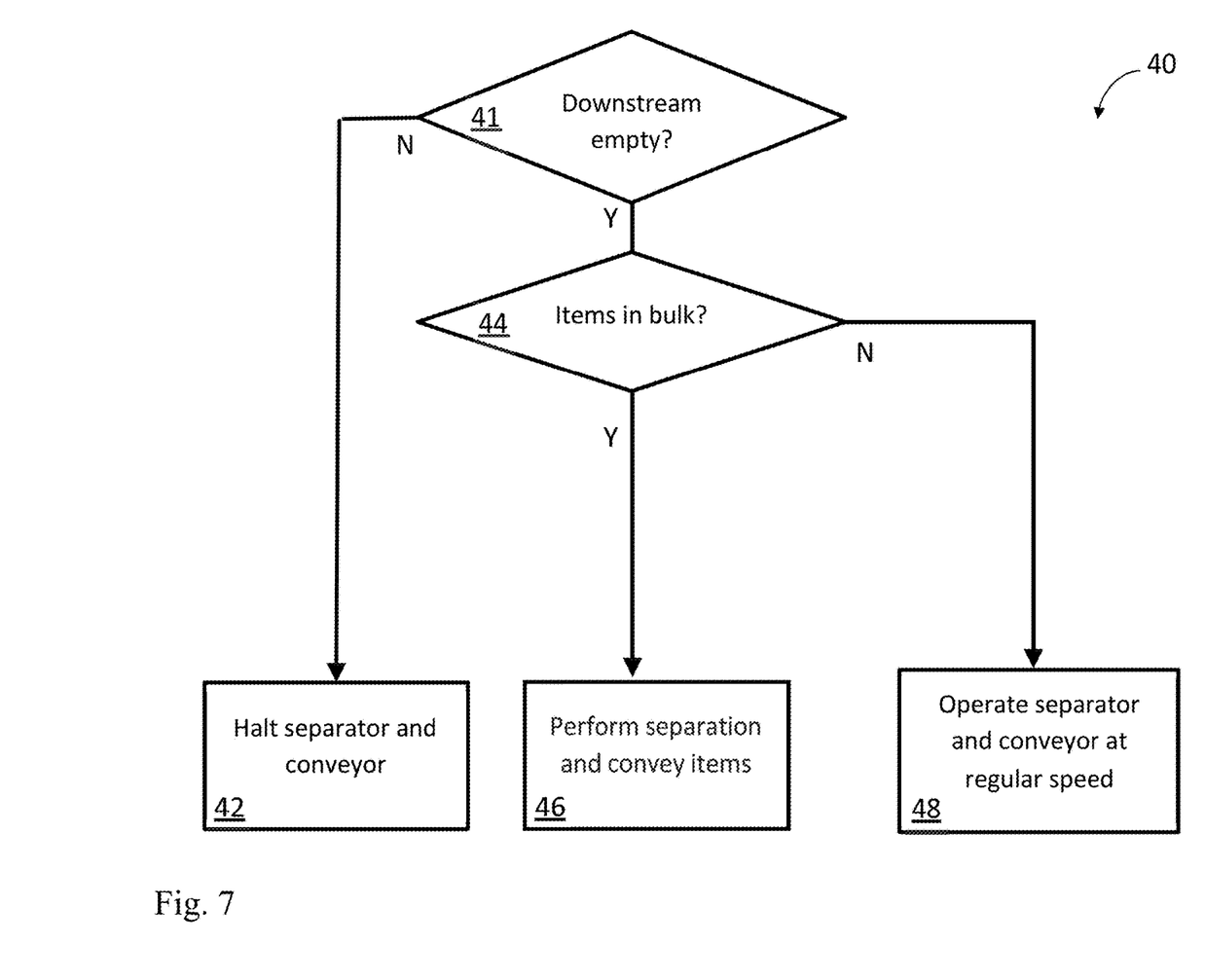
FIG. 7 is a high-level flowchart of a further method according to the teachings disclosed herein.

FIG. 7 is a high-level flowchart of a further method 40 for conveying items, e.g., for loading a bulk of items into a truck at a dock. The method 40 may for instance by carried out with a system according to the embodiments described herein, having an extendable conveyor and a separation module.

At step 41, it is detected, e.g., using a photodiode sensor, whether there are items at the downstream side of the extendable conveyor. The downstream side of the conveyor may for instance extend into the loading volume of the truck, where staff or personnel is in the process of unloading any items arriving via the conveyor into the truck. In the presence of items, both the extendable conveyor and the separation module are halted at step 42, in order for the personnel to discharge the items present at the downstream end. Once the downstream side has been discharged, i.e., the downstream end of the extendable conveyor is "empty", both the extendable conveyor and the separation module may resume their conveying operation. At step 44, it is detected, e.g., using a sensor at the separation module, whether the items at the separation module arrive in a bulk situation, e.g., as a pile. In the case of items arriving in bulk, then the separation process, in particular using deceleration of the separation module, is started at step 46. This separation is essentially similar to the method described with reference to FIG. 5 above or with the separation operation described with reference to any system described herein. The separated items are conveyed onwards using the extendable conveyor.

In the absence of a bulk of items (e.g., no items; or items already sparsely separated) at the separation module, then both the extendable conveyor and the separation module run at a same (e.g., regular or continuous) speed, at step 48. In this case, the separation module and the extendable conveyor may essentially operate as a single conveyor.

Figure 8:
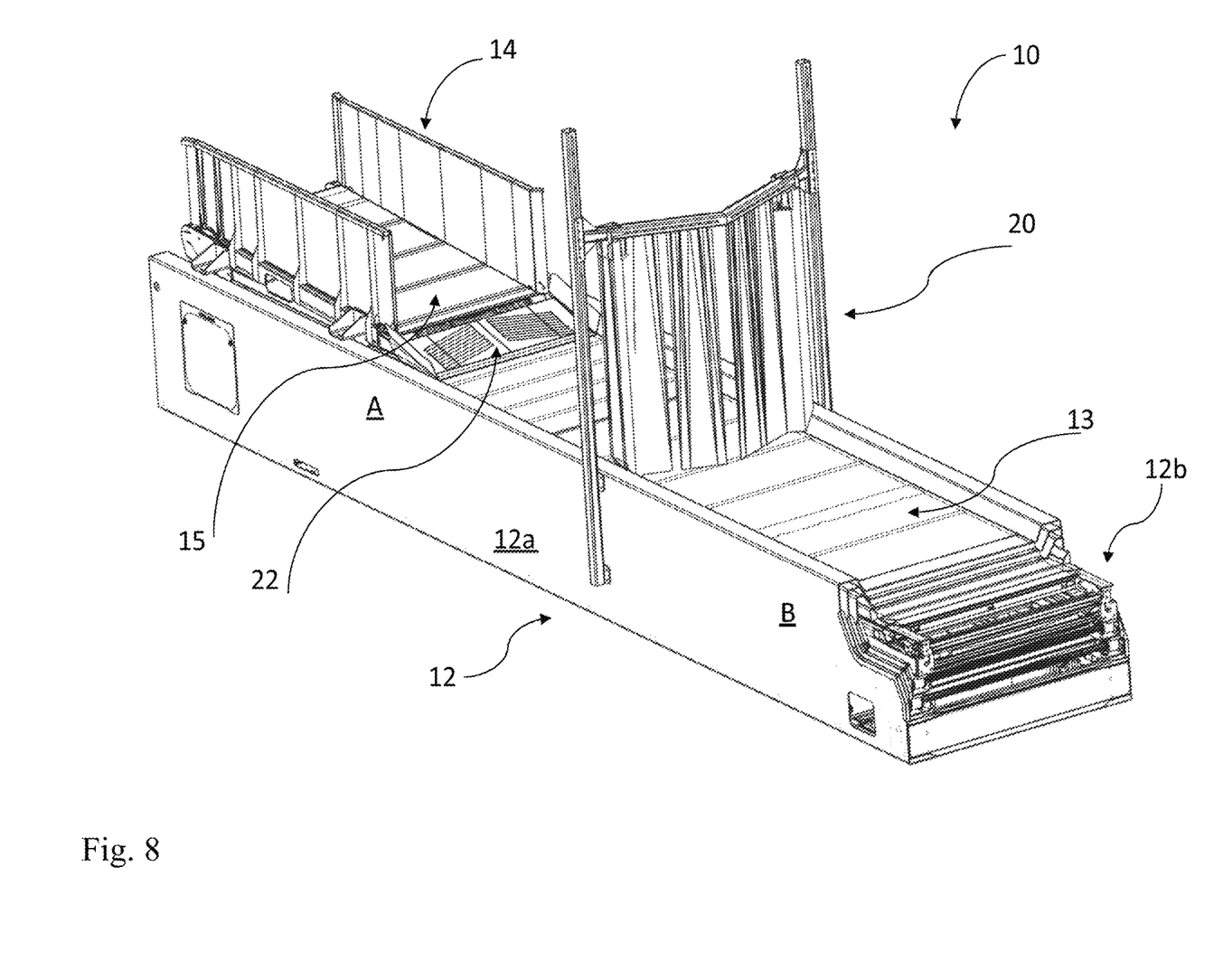
FIG. 8 is a perspective view of a system according to the teachings disclosed herein.

FIG. 8 is a perspective view of a system 10. The system 10 comprises an extendable conveyor 12, a separation module 14, and a flexible strip curtain 20. The extendable conveyor 12 is operable to convey items (not shown) from an upstream side A of the extendable conveyor 12 to a downstream side B of the extendable conveyor 12.

The extendable conveyor 12 has multiple movable telescope portions 12b, which are shown retracted within a base portion 12a to form a retracted state of the extendable conveyor 12. The telescope portions may also be extended so as to be distributed along a conveying path of the telescopic conveyor 12, thereby allowing to increase or decrease the length of the conveyor.

The separation module 14 is operable for conveying the items towards the upstream side A of the extendable conveyor 12 at variable speeds. In the example of FIG. 8, the separation module 14 fully overlaps with the extendable conveyor 12. In this case, the upstream side A may be defined as the region of interface, where items from the separation module 14 are conveyed onto the extendable conveyor 12, even if the extendable conveyor 12 extends further upstream (underneath the separation module 14).

As can be seen from FIG. 8, the separation module for use in conveying system may be provided separately from the other system components. In particular, the separation module may be provided in form of an add-on module to existing extendable conveyors 14. In other examples, the system 10 may be provided as an integrated conveying system.

In any case, the separation module 14 is configured to decelerate the conveying of the items on the separation module, as described in detail further above.

The separation module 14 is positioned relative to the extendable conveyor 12 with a level difference between conveying surface 15 of the separation module 14 and conveying surface 13 of the extendable conveyor 12 at its upstream side A. The level difference is equipped with an inclined plane in form of a plate 22.

When items reach the end of the separating module 14, they are being conveyed over the downward slope formed by the level difference and the plate. As a result, the upper items out of the bulk of items tumble towards the front (in conveying direction), thereby further separating the bulk of items.

The at least partially separated items are then conveyed towards downstream side B, thereby passing through a flexible strip curtain 20, which is essentially similar to the curtain of FIGS. 3 and 4. The curtain 20 has multiple members in form of flexible strips. The curtain 20 is arranged essentially in a plane, which is transverse to the conveying direction of the conveying system.

The flexible strip curtain 20 is positioned over the conveying surface 13 of the extendable conveyor 12. A frame holds the curtain 20 and extends across the conveying surface 13 of the extendable conveyor 12. The outermost elements of the flexible strip curtain 20 are less flexible (or more massive) than the inner elements, thereby facilitating passage of items closer to the longitudinal central conveying axis and hinder passage of items closer to the side of the conveyor 12.

As shown in FIG. 8, the separation module 14 is equipped with (relatively high) side guards in order to prevent the upper items out of a bulk of items from falling over the side edges. However, for the extendable conveyor 12, such high side guards are not needed since the separation module 14 and/or the curtain 20 provide for a flow of items which is separated by gaps and centered mostly towards the longitudinal central conveying axis of the extendable conveyor 12.

In the example shown, the extendable conveyor is equipped with (relatively low) integrated side guides.

In other embodiments, the extendable conveyor may be equipped partly (e.g., only along the base portion 12a; or from the separation module 14 to the curtain 20) with high side guards.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements. The mention of a "unit" or a "module" does not preclude the use of more than one unit or module.

The invention claimed is:

1. A conveying system comprising:
an extendable conveyor, operable to convey items from an upstream side of the extendable conveyor to a downstream side of the extendable conveyor, and configured to increase the distance from the upstream side to the downstream side, and
a separation module, operable for conveying items towards the extendable conveyor and configured to decelerate the conveying of the items on the separation module wherein the separation module is configured to be positioned relative to the extendable conveyor with a level difference between a conveying surface of the separation module and a conveying surface of the extendable conveyor at its upstream side wherein by decreasing the conveying speed, a deceleration of the items is achieved, and an impulse is imparted on the items, such that a pile of items is separated into single pieces, wherein the item which is the top- and front-most item of the pile falls onto the extendable conveyor,
wherein the conveying system further comprises a flexible strip curtain, the flexible strip curtain having at least three members, wherein a second member is positioned between first and third members and has a higher flexibility than the first and third members.

2. The system according to claim 1, wherein the separation module is configured to convey the items at variable speeds.

3. The system according to claim 1, wherein the separation module is configured to decelerate the conveying of the items fully to a halt.

4. The system according to claim 1, wherein the separation module is configured to convey items at least at a first speed and a second speed, the first speed being smaller than the second speed, and the extendable conveyor is configured to convey items at least at essentially the second speed.

5. The system according to claim 1, wherein the system further comprises one or more sensors configured to detect the presence or absence of items at one or more of the following: the separation module, the upstream side of the extendable conveyor, the downstream side of the extendable conveyor.

6. The system according to claim 1, wherein the flexible strip curtain is positioned in proximity to the extendable conveyor.

7. The system according to claim 1, wherein cross-sections of the first and third members are shaped asymmetrically, such as to impart a force on items travelling along the conveying direction through the curtain, the force acting essentially perpendicular to the conveying direction towards the central longitudinal axis of the extendable conveyor.

8. A separation module for use in a conveying system according to claim 1.

9. A method for controlling a conveying system with an extendable conveyor, a separation module, and a flexible strip curtain, the flexible strip curtain having at least a first member, a second member, and a third member, wherein the second member is positioned between the first member and the third member, and wherein the second member has a higher flexibility than the first member and the third member, the method comprising:
detecting a presence of a plurality of items at the separation module; and
controlling, responsive to the detecting, a conveying speed of the separation module to decelerate the plurality of items.

10. The method according to claim 9, wherein the detecting further comprises detecting the presence or absence of items at the upstream side of the extendable conveyor and/or detecting the presence or absence of items at the downstream side of the extendable conveyor.

11. The method according to claim 10, further comprising controlling a conveying speed of the extendable conveyor based on the outcome of the detecting, in particular the detecting of presence or absence of items at one or more of the following: the separation module; the upstream side of the extendable conveyor; the downstream side of the extendable conveyor.

12. A computer program product, comprising a computer readable hardware storage device having computer readable program code stored therein, said program code executable by a processor of a computer system to implement a method including program code configured to, when executed in a computing device, to carry out the method of claim 9.

* * * * *